United States Patent [19]

Muramoto

[11] Patent Number: 5,500,740

[45] Date of Patent: Mar. 19, 1996

[54] VIDEO SIGNAL PROCESSING WITH COMMON DELAY LINE FOR LUMINANCE INTERPOLATION AND COLOR CONVERSION

[75] Inventor: Tomotaka Muramoto, Tokyo, Japan

[73] Assignee: Canon Kabushiki Kaisha, Tokyo, Japan

[21] Appl. No.: 453,808

[22] Filed: May 30, 1995

Related U.S. Application Data

[63] Continuation of Ser. No. 318,528, Oct. 5, 1994, abandoned, which is a continuation of Ser. No. 175,488, Dec. 29, 1993, abandoned, which is a continuation of Ser. No. 915,411, Jul. 16, 1992, abandoned, which is a division of Ser. No. 690,509, Apr. 24, 1991, abandoned.

[30] Foreign Application Priority Data

May 1, 1990 [JP] Japan .................................. 2-111832

[51] Int. Cl.⁶ ................................................... H04N 9/79
[52] U.S. Cl. ......................... 358/327; 358/310; 348/455; 348/905; 348/560
[58] Field of Search ..................................... 358/327, 310, 358/314, 315, 330, 329; 348/571, 708, 712, 713, 663, 665, 455, 453, 905, 560; H04N 9/79

[56] References Cited

U.S. PATENT DOCUMENTS

| | | | |
|---|---|---|---|
| 4,941,054 | 7/1990 | Muramoto | 358/329 |
| 4,984,095 | 1/1991 | Takayama et al. | 358/314 |
| 4,992,852 | 2/1991 | Sekizawa et al. | 348/455 |

Primary Examiner—Tommy P. Chin
Assistant Examiner—Khoi Truong
Attorney, Agent, or Firm—Robin, Blecker, Daley & Driscoll

[57] ABSTRACT

A video signal reproducing apparatus for reproducing a video signal recorded on a magnetic recording medium includes a modulating circuit for receiving a color-difference line-sequential signal and modulating the color-difference line-sequential signal at intervals of one horizontal scanning period, an adding circuit for adding a luminance signal to the color-difference line-sequential signal modulated by the modulating circuit, a delay circuit for delaying a signal outputted from the adding circuit or the modulated color-difference line-sequential signal by one horizontal scanning line, and a subtracting circuit for subtracting the signal outputted from the adding circuit and not delayed by the delay circuit from a signal which has been delayed by the delay circuit by one horizontal scanning line. The video signal reproducing apparatus is arranged to provide line interpolation information for the luminance signal as well as simultaneous color-difference signals.

9 Claims, 4 Drawing Sheets

VIDEO SIGNAL PROCESSING WITH COMMON DELAY LINE FOR LUMINANCE INTERPOLATION AND COLOR CONVERSION

This is a continuation application under 37 CFR 1.62 of prior application Ser. No. 08/318,528, filed Oct. 5, 1994 now abandoned, which is a cont. of Ser. No. 08/175,488, filed Dec. 29, 1993, aban., which is a cont. of Ser. No. 07/915,411, filed Jul. 16, 1992, aban., which is a div. of Ser. No. 07/690,509, filed Apr. 24, 1991, aban.

BACKGROUND OF THE INVENTION

1. Field of the Invention

The present invention relates to a reproducing apparatus for reproducing a field-recorded video signal.

2. Description of the Related Art

In a video signal reproducing apparatus which reproduces a video signal formed by recording only either one of fields constituting one frame of video signal, as in the case of field recording adopted by a still video system, it is common practice to perform the processing of alternately outputting a recorded field signal and a signal, which has been line-interpolated by a 1H (horizontal scanning line) delay line, at intervals of one vertical scanning period in order to prevent a flicker (luminance fluctuations which are visually perceived in a vertical direction).

A circuit of the type shown in FIG. 1 has conventionally been used as a circuit for effecting the above-described interpollution processing. FIG. 1 is a block diagram schematically showing one example of a reproduced signal processing circuit for a still video system.

The circuit shown in FIG. 1 comprises an input terminal 1 for receiving a luminance signal Y+S which has been reproduced, an input terminal 2 for receiving a select signal HOKAN for selecting a field to be interpolated or a field not to be interpolated, an input terminal 3 for receiving a color-difference line-sequential signal (R-Y/B-Y) which has been reproduced, an input terminal 4 for receiving a control signal LINE for effecting simultaneous conversion of such a color-difference line-sequential signal, and input terminals 5 and 6 for respectively receiving subcarrier signals FSC0 and FSC90 having phase angles of 0° and 90° which are used for quadrature two-phase modulation of a chrominance signal.

The luminance signal inputted through the input terminal 1 is applied to a 1H delay line (1H DL) 7, and also to an adder 9 as well as to a terminal b of a switch 10. The signal having passed through the 1H delay line 7 is applied to a low-pass filter (LPF) 8, where a clock component is eliminated from the signal. Thereafter, the signal is inputted to the adder 9. In the adder 9, the input signal is added to the luminance signal inputted from the input terminal 1 to form a line-interpolated signal. The line-interpolated signal is applied to a terminal a of the switch 10. The switch 10 is alternately switched at intervals of one vertical scanning period by the select signal HOKAN. If the switch 10 makes connection with the terminal a, the interpolated signal is inputted to an adder 11, while if the switch 10 makes connection with the terminal b, the non-interpolated signal is inputted to the same. In consequence, interpolated and non-interpolated signals are alternately selected and inputted to the adder 11 at intervals of one vertical scanning period.

In the meantime, the color-difference line-sequential signal inputted through the input terminal 3 is applied to a 1H (horizontal scanning line) delay line (1H DL) 13 and also to a terminal e of a switch 15 as well as to a terminal g of a switch 16. The signal having passed through the 1H delay line 13 is applied to a low-pass filter (LPF) 14, where a clock component is eliminated from the signal. Thereafter, the signal is applied to a terminal d of the switch 15 and to a terminal h of the switch 16. Each of the switches 15 and 16 is switched at intervals of one horizontal scanning period by the control signal LINE inputted through the input terminal 4 so that a color-difference signal R-Y and a color-difference signal B-Y are successively outputted through a terminal f and a terminal i, respectively. The color-difference signals R-Y and B-Y are inputted to a modulator (MOD) 17. The modulator 17 modulates the color-difference signals R-Y and B-Y by using subcarriers which have respectively been inputted through the terminals 5 and 6, and forms a quadrature two-phase modulated signal by addition. The quadrature two-phase modulated signal is supplied to a band-pass filter (BPF) 18, where an unwanted component is eliminated from the signal. Thereafter, the signal is supplied to the adder 11, where it is added to the aforesaid luminance signal to form a composite signal. The composite signal is outputted through an output terminal 12.

The above-described conventional example uses the 1H CCD delay line 7 for the purpose of interpolating a luminance signal and, in addition, the 1H CCD delay line 13 for the purpose of effecting simultaneous conversion of a color-difference line-sequential signal, whereby the luminance signal and the color-difference signal are each delayed by one horizontal scanning line. Such a CCD delay line is small compared to a glass delay line and has a number of advantages such as a small distortion and a wide frequency band. However, the CCD delay line has two disadvantages: large power consumption and clock noise. These disadvantages have made it difficult to adopt the circuit of FIG. 1 for products of reduced size and power consumption.

SUMMARY OF THE INVENTION

It is, therefore, an object of the present invention to provide a video signal reproducing apparatus which is arranged to balanced-modulate a color-difference line-sequential signal by using a subcarrier whose phase switches by 90° at intervals of one horizontal scanning period, add the balanced-modulated signal to a luminance signal before interpolation, and cause the balanced-modulated signal together with the luminance signal to pass through a single interpolating circuit, thereby effecting both interpolation of the luminance signal and simultaneous conversion of a color-difference signal by means of a single delay line so as to achieve reduced power consumption.

To achieve the above object, in accordance with the present invention, there is provided a video signal reproducing apparatus for reproducing a video signal recorded on a magnetic recording medium, which comprises modulating means for receiving a color-difference line-sequential signal and modulating the color-difference line-sequential signal at intervals of one horizontal scanning period, adding means for adding a luminance signal to the color-difference line-sequential signal modulated by the modulating means, delay means for delaying a signal outputted from the adding means or the modulated color-difference line-sequential signal by one horizontal scanning line, and subtracting means for subtracting the signal outputted from the adding means and not delayed by the delay means from a signal which has been delayed by the delay means by one horizontal scanning line.

In the above-described arrangement, the color-difference line-sequential signal modulated by the modulating means is added to the luminance signal, and a signal obtained by the addition or the modulated color-difference line-sequential signal is delayed by one horizontal scanning line. The signal obtained by adding the modulated color-difference line-sequential signal to the luminance signal which has not been delayed is subtracted from the signal delayed by one horizontal scanning line to obtain line interpolation information for the luminance signal as well as simultaneous color-difference signals.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

Figure 1:
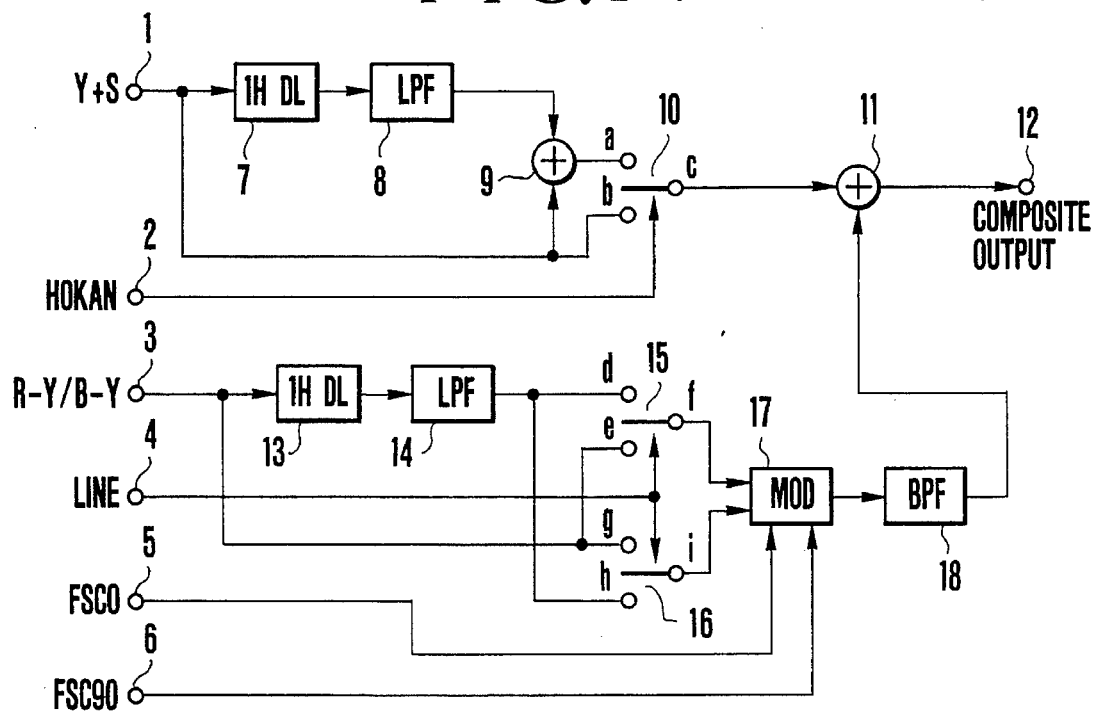
FIG. 1 is a block diagram schematically showing the construction of a reproduced signal processing circuit for a conventional example of a still video system.
Figure 2:
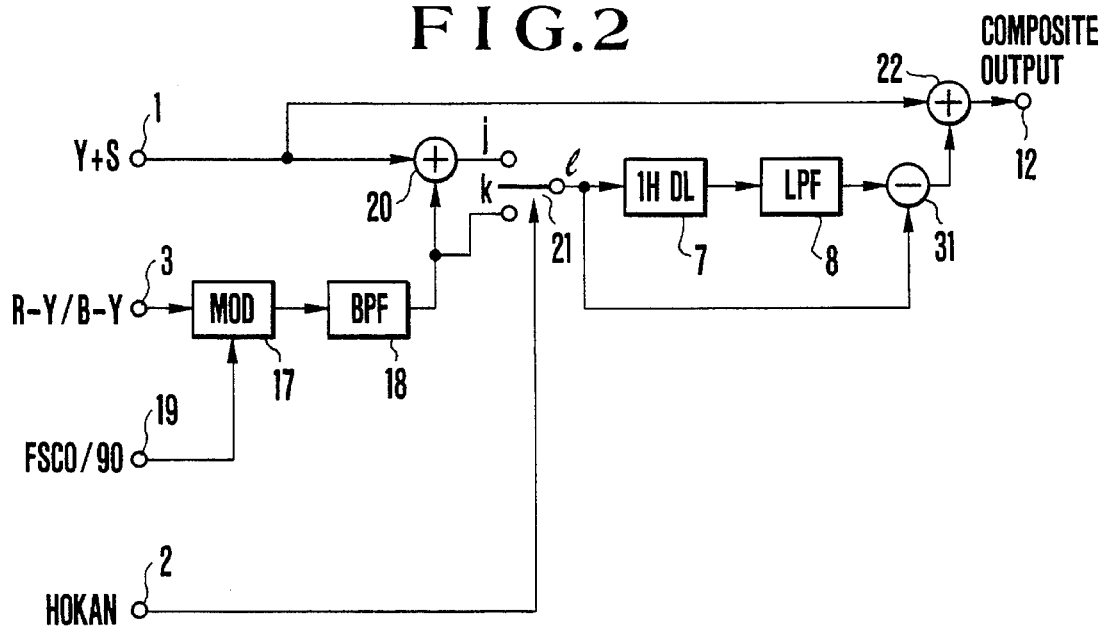
FIG. 2 is a block diagram schematically showing the construction of a reproduced signal processing circuit for a still video system according to a first embodiment of the present invention.

FIG. 2 is a block diagram schematically showing one example of a reproduced signal processing circuit for a still video system according to a first embodiment of the present invention. In FIG. 2, identical reference characters are used to denote portions which are substantially identical to those of the conventional example of FIG. 1.

The circuit shown in FIG. 2 comprises an input terminal 1 for receiving a luminance signal Y+S, an input terminal 3 for receiving a color-difference line-sequential signal R-Y/B-Y, an input terminal 19 for receiving a subcarrier for modulating a chrominance signal, an input terminal 2 for receiving a control signal for interpolating the luminance signal, an adder 20 for adding the luminance signal to the chrominance signal, a switch 21 for selecting the output of the adder 20 or the output of a band-pass filter 18 which will be described later, a 1H CCD delay line (1H DL) 7 for interpolation, a low-pass filter (LPF) 8 for eliminating a clock component from the output of the 1H CCD delay line 7, a subtracter 31 for providing interpolation information, an adder 22 for adding the luminance signal, the chrominance signal and the interpolation information, a modulator (MOD) 17 for modulating the chrominance signal, a band-pass filter (BPF) 18 for the chrominance signal, and an output terminal 12 through which a composite video signal is outputted.

In the above-described arrangement, the luminance signal inputted through the input terminal 1 is applied to both of the adders 20 and 22. The chrominance signal which has been inputted through the input terminal 3 for receiving the color-difference line-sequential signal, is modulated by the modulator (MOD) 17 by using the subcarrier inputted through the terminal 19. The phase of the subcarrier inputted through the input terminal 19 switches at intervals of 1H (one horizontal scanning line) so that when the color-difference signal R-Y is to be modulated, the phase becomes 90°, or when the color-difference signal B-Y is to be modulated, the phase becomes 0°.

Figure 3:
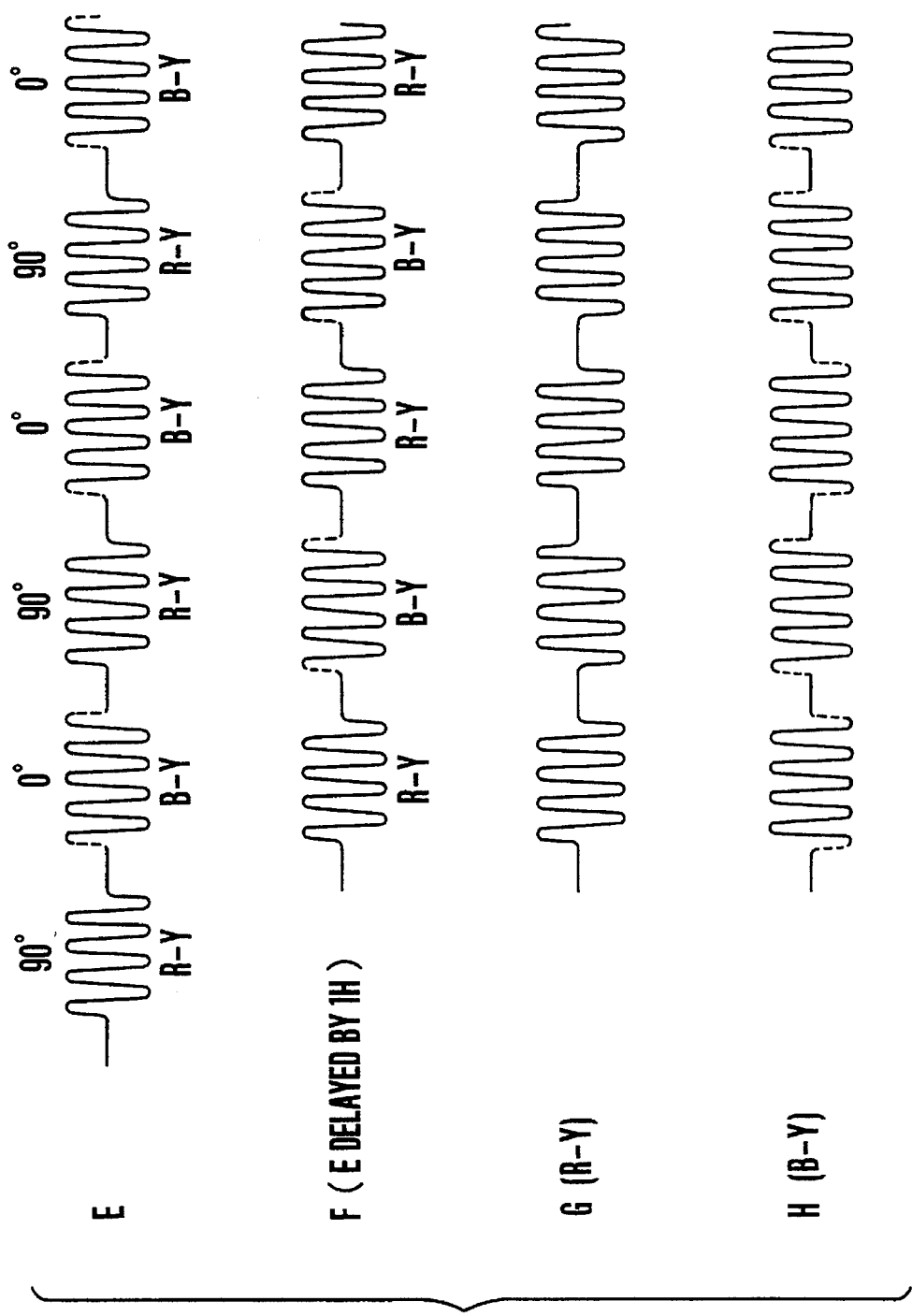
FIG. 3 is a diagram showing waveform examples of subtracter output signals which are obtained from a modulator output and a 1H-delayed signal.

The phase relationship of the subcarrier in the output from the modulator 17 is shown as E in FIG. 3. The signal E is band-limited by the band-pass filter 18, whereby only a frequency component around the frequency of the subcarrier is extracted. The result is added to the luminance signal (Y+S) by the adder 20. The chrominance signal which has thus been added to the luminance signal is applied to a terminal j of the switch 21, while the chrominance signal, before added to the luminance signal, is applied to a terminal k of the switch 21. The switch 21 is alternately switched at intervals of one field so that the signal provided at the terminal j is selected when the luminance signal is to be interpolated or the signal provided at the terminal k is selected when the luminance signal is not to be interpolated. The selected signal is provided at a terminal l.

Figure 4:
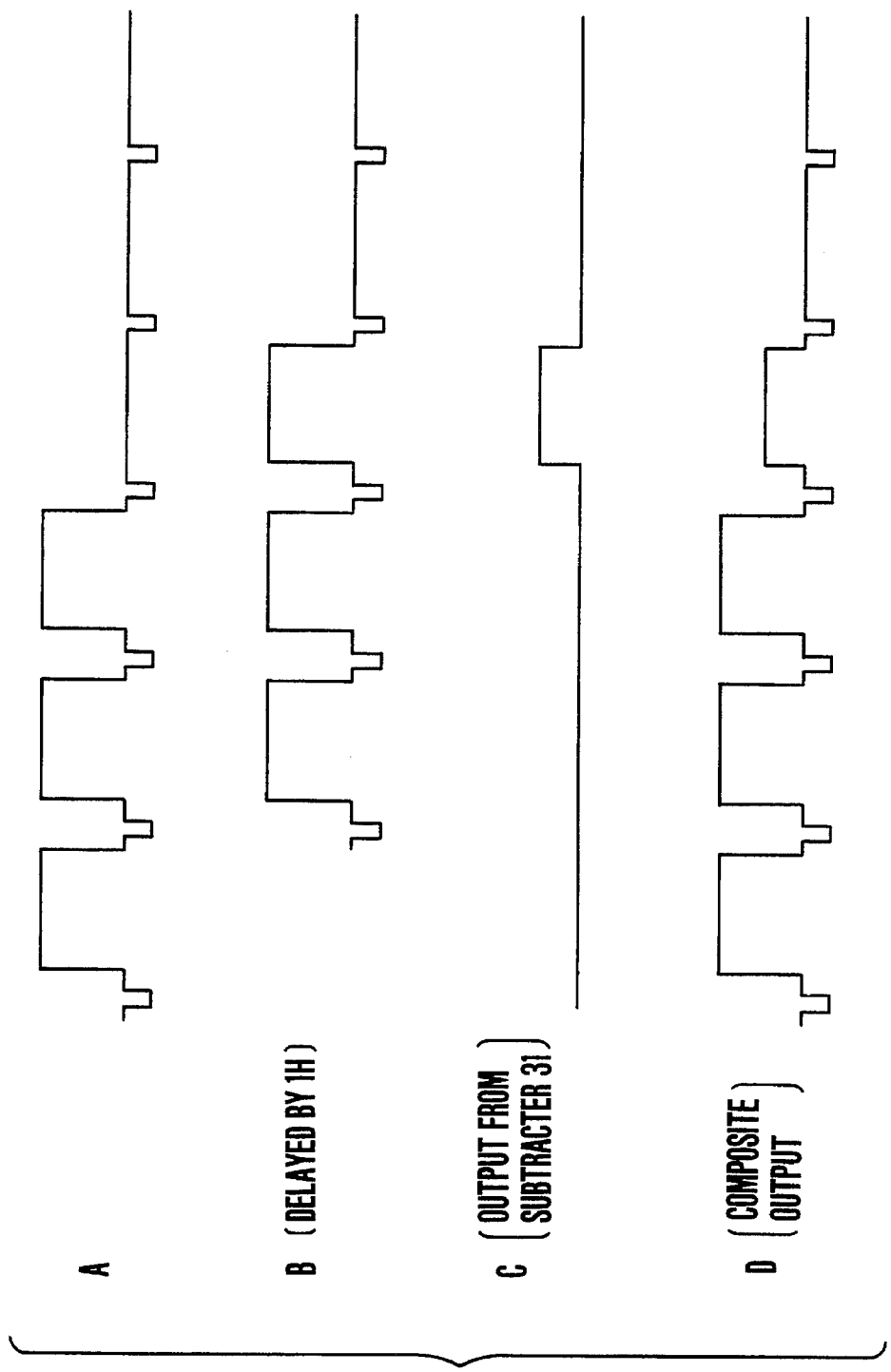
FIG. 4 is a diagram showing waveform examples of a luminance signal component obtained in the circuit of FIG. 2.

The waveform of the luminance-signal component of the signal provided at the terminal l when interpolation is to be performed is shown as A in FIG. 4. The signal indicated by A passes through the 1H CCD delay line 7 and is supplied to the low-pass filter 8, where a clock component is eliminated from the signal, thereby providing a 1H-delayed signal as shown in Part B of FIG. 4. Then, the subtracter 31 subtracts the signal A from the 1H-delayed signal B to provide a signal shown as C. The signal C is added to the input luminance signal by the adder 22, so that a luminance signal interpolated as shown in Part D of FIG. 4 is obtained.

In a case where no interpolation is carried out, the signal provided at the terminal k is selected by the switch 21, so that no luminance signal is provided at the terminal l. Accordingly, no luminance-signal component is outputted to the subtracter 31, and the luminance-signal component of the output of the adder 22 becomes a non-interpolated luminance signal.

The chrominance signal appears as the signal E of FIG. 3 whichever of the signals provided at the terminals j and k is selected by the switch 21. Accordingly, the chrominance-signal component provided at the terminal l is formed into a signal delayed by 1H (one horizontal scanning line) as shown in Part F of FIG. 3 by passing through the 1H CCD delay line 7 and the low-pass filter 8.

In consequence, the subtracter 31 subtracts the signal E from the signal F to form a signal in which the R-Y components of the chrominance signal follow one after another in succession as shown in Part G of FIG. 3 and the B-Y components of the chrominance signal follow one after another in succession as shown in Part H of FIG. 3. Thus, a chrominance signal component in which the quadrature two-phase modulated R-Y and B-Y components have been multiplexed can be obtained as the output of the subtracter 31.

As described above, the switch 21 is alternately switched between the terminals j and k at intervals of one field by the interpolation control signal (HOKAN) provided at the input terminal 2. Accordingly, from the adder 22, an interpolated signal and a non-interpolated signal can be alternately outputted as the luminance signal whereas a signal which has been converted into a line-simultaneous, quadrature two-phase modulated signal can be obtained as the chrominance signal. Thus, a composite signal can be outputted through the terminal 12 on the basis of the above-described signals.

Although the foregoing description has been made as to the reproduction of a field-recorded signal, the above-described embodiment as it stands can also be applied to a frame-recorded signal by adopting an arrangement in which the non-interpolation side of the switch 21 is kept selected by the interpolation control signal.

As is apparent from the foregoing description, in accordance with the above-described embodiment, in spite of its circuit scale approximately equivalent to that of a circuit construction where no interpolation is performed, it is possible to effect both the interpolation of a luminance signal and the simultaneous conversion of a color-difference line-sequential signal, thereby outputting these signals as a composite signal.

Figure 5:
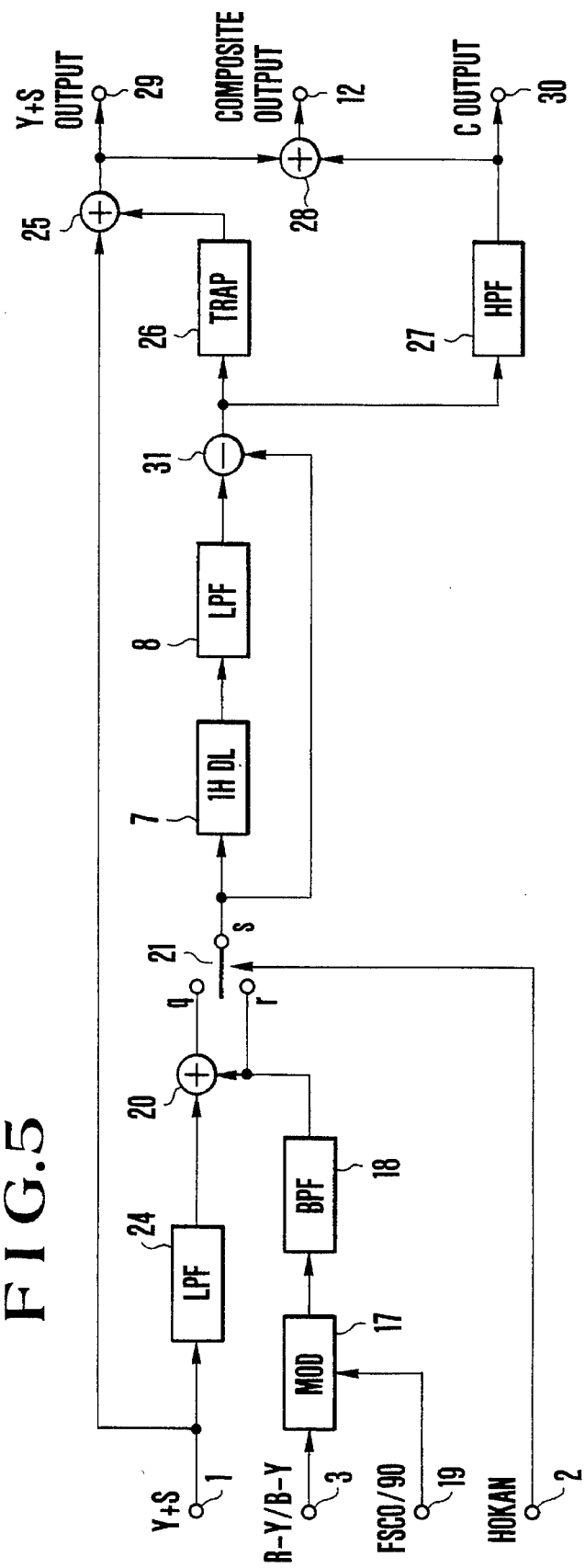
FIG. 5 is a block diagram schematically showing the construction of a reproduced signal processing circuit for a still video system according to a second embodiment of the present invention.

FIG. 5 is a block diagram schematically showing the construction of a reproduced signal processing circuit for a still video system according to a second embodiment of the present invention. In FIG. 5, identical reference characters are used to denote portions which are substantially identical to those of the first embodiment described above.

The circuit shown in FIG. 5 comprises a low-pass filter (LPF) 24 for band-limiting a luminance signal, an adder 25 for adding the luminance signal to interpolation information, a trapping circuit (TRAP) 26 for eliminating a subcarrier from a chrominance signal, a high-pass filter (HPF) 27 for eliminating the interpolation information from the luminance signal, an adder 28 for adding the luminance signal to the chrominance signal, an output terminal 29 through which the luminance signal is outputted, and an output terminal 30 through which the chrominance signal is outputted.

In the above-described arrangement, the luminance signal is band-limited by the low-pass filter 24 and inputted to the adder 20. The cut-off frequency of the low-pass filter 24 is selected to be approximately 1.5 MHz so that a frequency component around the subcarrier frequency of the chrominance signal is eliminated. A color-difference line-sequential signal is processed in a manner similar to that explained in connection with the first embodiment. After modulated by the modulator 17, the color-difference line-sequential signal passes through the band-pass filter 18 and is added to the low-frequency component of the luminance signal by the adder 20.

Figure 6:
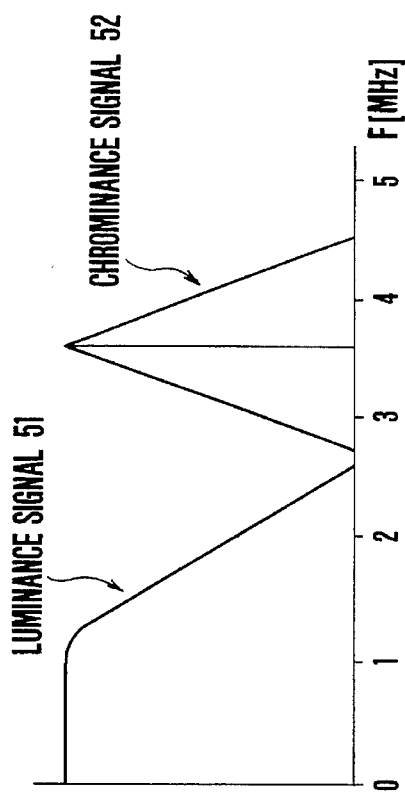
FIG. 6 is a chart showing the spectra of waveforms of both a luminance signal and a chrominance signal in the second embodiment of the present invention.

The output spectrum of the adder 20 is shown in FIG. 6.

As shown in FIG. 6, a luminance signal 51 is band-limited by the LPF 24 so that the luminance signal 51 and a chrominance signal 52 do not overlap in frequency band.

Referring again to FIG. 5, a signal in which the low-frequency component of the luminance signal has been added to the chrominance signal is applied to a terminal q of the switch 21, while the chrominance signal is applied to a terminal r of the switch 21. These signals are alternately selected and provided at a terminal s at intervals of one field. The signal provided at the terminal s is processed in a manner similar to that explained in connection with the first embodiment. In the case of the luminance signal, its interpolation information is outputted from the subtracter 31. In the case of the chrominance signal, a signal which has been converted into a line-simultaneous, quadrature two-phase modulated signal is outputted from the subtracter 31. Unlike the case of the first embodiment, as shown in FIG. 6, the frequency band of the luminance signal and that of the chrominance signal do not overlap in the output of the subtracter 31. It is, therefore, possible to easily separate the luminance and chrominance signals from each other.

The interpolation information for the luminance signal is in turn inputted to the trapping circuit 26, where a chrominance component is eliminated from the interpolation information. Thereafter, the result is added to the initial luminance signal by the adder 25, and is outputted through the luminance signal output terminal 29 and is also inputted to the adder 28.

In the meantime, the chrominance signal is inputted to the high-pass filter 27, where a luminance component is eliminated from the chrominance signal. Thereafter, the result is outputted through the chrominance signal output terminal 30 and is also added to the adder 28. In the adder 28, the luminance signal and the chrominance signal are added and outputted through the output terminal 12 as a composite signal.

It is to be noted that the second embodiment is also applicable to frame reproduction by adopting an arrangement in which the non-interpolation side of the switch 21 is kept selected by the interpolation control signal.

In accordance with the second embodiment in which the luminance signal is band-limited by the low-pass filter 24, it is possible to achieve the following advantages. (1) separation of the luminance signal and the chrominance signal is facilitated, whereby an output in which the luminance signal and the chrominance signal are independent from each other can be obtained (as an output at the terminal s). (2) Since only the low-frequency component of the luminance signal is subjected to interpolation, it is possible to prevent a luminance fluctuation in the high-frequency component of a picture having a strong vertical correlation. (3) Since only the low-frequency component of the luminance signal is subjected to interpolation, it is possible to suppress occurrence of an irregularly stepped portion in an oblique line.

As described above, in accordance with the second embodiment, a color-difference line-sequential signal is balanced-modulated by using a subcarrier whose phase switches by 90° at intervals of one horizontal scanning period, and the balanced-modulated color-difference line-sequential signal is added to a luminance signal. The signal obtained by the addition is delayed by 1H, and a non-delayed signal is subtracted from the 1H-delayed signal, thereby making it possible to effect both interpolation of the luminance signal and simultaneous conversion of a chrominance signal by means of a single delay line.

As described above, in accordance with either of the aforesaid embodiments, a color-difference line-sequential signal is balanced-modulated at intervals of one horizontal scanning period, then the balanced-modulated signal is added to a luminance signal before interpolation, and then the balanced-modulated signal together with the luminance signal passes through a common interpolating circuit. Accordingly, it is possible to effect both interpolation of the luminance signal and simultaneous conversion of a color-difference line-sequential signal by means of a single delay line, thereby reducing the power consumption of the entire apparatus.

What is claimed is:

1. A signal processing apparatus, comprising:
   (a) input means for receiving a luminance signal for one field and a color-difference line-sequential signal;
   (b) signal processing means for obtaining a signal for interpolation and for providing simultaneous line-sequential color-difference signals, said signal processing means having means for providing an added output of said luminance signal and said line-sequential color-difference signal, a single CCD delay line and switch means for selectively feeding said added output of said luminance signal and line-sequential color-difference signal or said line-sequential color-difference signal to said CCD delay line;
   (c) control means for controlling switching operation of said switch means; and
   (d) means for obtaining a composite signal containing an interpolated luminance signal and a simultaneously converted signal by adding the output of the signal processing means and the luminance signal obtained through the input means.

2. An apparatus according to claim 1, wherein said control means is arranged to operate said switch means to select said added output of said luminance signal and said line-sequential color-difference signal at the time of effecting interpolation of the luminance signal and to select said line-sequential color-difference signal at the time of not effecting the interpolation.

3. An apparatus according to claim 1, further comprising:
   filter means arranged to receive the output of said CCD delay line to remove a clock noise in said output of said CCD delay line.

4. An apparatus according to claim 1, wherein the line-sequential color-difference signal includes R-Y and B-Y signals.

5. A signal processing apparatus according to claim 1, wherein said processing means includes filter means for extracting a low-zone component from the luminance signal and to supply the component to an adder.

6. A video signal reproducing apparatus comprising:
   (a) input means for receiving a luminance signal and a chrominance signal respectively;
   (b) switch means for outputting selectively a combined signal of the luminance signal and the chrominance signal or the chrominance signal;
   (c) delay means for delaying the output of the switch means by 1H, said delay means being used commonly for processing the luminance signal and the chrominance signal;
   (d) processing means for processing the output of the switch means and the output of the delay means to obtain a signal for interpolating the luminance signal and a simultaneously converted chrominance signal; and
   (e) means for obtaining an interpolated composite video signal by adding the signal for interpolation and the simultaneously converted chrominance signal to the luminance signal from the input means.

7. A video signal reproducing apparatus according to claim 6, wherein the 1H delay line includes a CCD delay line.

8. A video signal reproducing apparatus according to claim 6, wherein the color-difference line-sequential signal includes color-difference signals R-Y and B-Y.

9. A video signal reproducing apparatus according to claim 6, wherein a high-frequency component is eliminated from the luminance signal which is supplied to said switch means.

* * * * *